United States Patent [19]

Canova

[11] Patent Number: 5,180,762
[45] Date of Patent: Jan. 19, 1993

[54] STABILISER COMPOSITION FOR POLYPROPYLENE, COMPRISING TRIAZINE COMPOUNDS CONTAINING PIPERIDINE GROUPS, AND METAL COMPOUNDS

[75] Inventor: Paola Canova, Casalecchio di Reno, Italy

[73] Assignee: Ciba-Geigy Corporation, Ardsley, N.Y.

[21] Appl. No.: 733,484

[22] Filed: Jul. 22, 1991

[30] Foreign Application Priority Data

Jul. 24, 1990 [IT] Italy .................. 21036 A90

[51] Int. Cl.$^5$ .................. C08K 5/34; C07D 401/14; C07D 403/14
[52] U.S. Cl. .................. 524/100; 524/94; 524/97; 524/432; 524/433; 524/436; 525/186; 544/113; 544/198; 544/209; 544/212; 546/187; 546/210
[58] Field of Search .................. 524/100, 94, 432, 433, 524/436, 97

[56] References Cited

U.S. PATENT DOCUMENTS

| | | | |
|---|---|---|---|
| 4,086,204 | 4/1978 | Cassandrini et al. | 524/100 |
| 4,108,829 | 8/1978 | Cassandrini et al. | 524/100 |
| 4,256,627 | 3/1981 | Moser et al. | 524/100 |
| 4,288,593 | 9/1981 | Rody | 524/100 |
| 4,315,859 | 2/1982 | Nikles | 524/100 |
| 4,321,374 | 3/1982 | Morimura et al. | 524/100 |
| 4,331,586 | 5/1982 | Hardy | 524/100 |
| 4,335,242 | 6/1982 | Wiezer et al. | 524/100 |
| 4,376,836 | 3/1983 | Wiezer et al. | 524/100 |
| 4,433,145 | 2/1984 | Wiezer et al. | 524/100 |
| 4,459,395 | 7/1984 | Cantatore | 524/100 |
| 4,468,488 | 8/1984 | Minagawa et al. | 524/100 |
| 4,477,615 | 10/1984 | Raspanti et al. | 524/100 |
| 4,533,688 | 8/1985 | Yoda et al. | 524/100 |
| 4,540,728 | 9/1985 | Nakahara et al. | 524/100 |
| 4,547,548 | 10/1985 | Cantatore | 524/100 |
| 4,698,381 | 10/1987 | Minagawa et al. | 524/100 |
| 4,740,544 | 4/1988 | Nakahara et al. | 524/100 |
| 5,037,870 | 8/1991 | Gugumus | 524/102 |

FOREIGN PATENT DOCUMENTS 2132621 7/1984 United Kingdom .

OTHER PUBLICATIONS

Chem. Abst. 106, 6003g (1987).
Derwent Abst. 27096 E/14.

*Primary Examiner*—Paul R. Michl
*Assistant Examiner*—Tae H. Yoon
*Attorney, Agent, or Firm*—Luther A. R. Hall

[57] ABSTRACT

The present invention relates to a stabiliser composition for polypropylene, comprising:
A) one or more triazine compounds containing groups of the formula (I) in which R is hydrogen, $C_1$-$C_4$alkyl, O•, OH, $C_1$-$C_8$alkoxy, $C_5$-$C_8$cycloalkoxy, $C_3$-$C_6$alkenyl, $C_7$-$C_9$phenylalkyl or $C_1$-$C_8$acyl, and
B) one or more oxides and hydroxides of Mg, Ca, Ba, Zn, Al and Sn, preferably Mg and Zn.

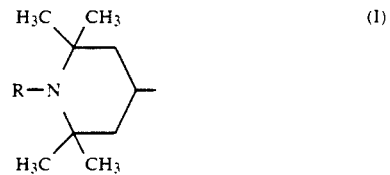

11 Claims, No Drawings

STABILISER COMPOSITION FOR POLYPROPYLENE, COMPRISING TRIAZINE COMPOUNDS CONTAINING PIPERIDINE GROUPS, AND METAL COMPOUNDS

The present invention relates to a novel method of stabilising polypropylene against photooxidative degradation by means of mixtures of derivatives of 2,2,6,6-tetramethylpiperidine and particular metal compounds.

It is known that polypropylene is susceptible to considerable changes in physical properties, such as a reduction in mechanical strength and a change in colour, if it is exposed to sunlight, due to photooxidative degradation caused by ultraviolet radiation.

To overcome this disadvantage, it is necessary to add suitable light stabilisers to the polymer, for example certain derivatives of benzophenone and benzotriazole, nickel complexes, esters of substituted benzoic acids, aromatic oxamides and sterically hindered amines.

However, the results obtained are greatly affected by the type of application of the polymer, such as mouldings, films, tapes or fibres.

The stabilization of polypropylene in fibre form involves particular difficulties; for this application, it is necessary to use products of relatively high molecular weight, which are resistant to evaporation and extraction.

Good results have been obtained with some triazine derivatives of 2,2,6,6-tetramethylpiperidine, such as those reported in U.S. Pat. Nos. 4,086,204, 4,108,829, 4,288,593, 4,315,859, 4,321,374, 4,331,586, 4,335,242, 4,376,836, 4,433,145, 4,459,395, 4,477,615, 4,533,688, 4,547,548 and 4,740,544, European Patents 94,048, 117,229 and 176,106 and Japanese Patent 61/176,662.

The results obtained so far have, however, not been completely satisfactory, so that a further improvement was desirable.

It has now been found, surprisingly, that the use of mixtures of one or more triazine derivatives of 2,2,6,6-tetramethylpiperidine and one or more particular metal compounds in the light stabilization of polypropylene fibres gives significantly higher values than the use of the piperidine compounds alone.

In particular, the present invention relates to a novel method of stabilizing polypropylene, which comprises using synergistic mixtures consisting of:

A) one or more triazine compounds containing groups of the formula (I)

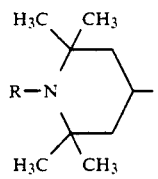

(I)

in which R is hydrogen, $C_1$-$C_4$alkyl, O•, OH, $C_1$-$C_8$alkoxy, $C_5$-$C_8$cycloalkoxy, $C_3$-$C_6$alkenyl, $C_7$-$C_9$phenylalkyl or $C_1$-$C_8$acyl, preferably hydrogen or methyl, and B) one or more oxides and hydroxides of Mg, Ca, Ba, Zn, Al and Sn, preferably Mg and Zn.

The use of some derivatives of 2,2,6,6-tetramethylpiperidine in a mixture with oxides or hydroxides of Mg or Zn for the stabilization of polyurethanes has been described in Japanese Patent 82/34,155, published on 24.2.1982.

This patent claims in particular the stabilization of polyurethanes with mixtures consisting of esters of 2,2,6,6-tetramethyl-4-piperidinol, oxides or hydroxides of Mg or Zn and organic phosphites.

These mixtures do not give satisfactory results if they are used for the stabilization of polypropylene fibres.

On the other hand, British Patent 2,132,621 has reported the use of mixtures of ZnO and esters of 2,2,6,6-tetramethyl-4-piperidinol as photodegrading agents for polyolefins, in particular polyethylene and polypropylene.

European Patent 290,386 relates to the stabilisation of organic polymers by means of mixtures of salts and oxides of Zn/Mg with polyesters of the formula

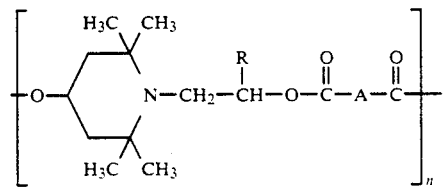

in which R is hydrogen or methyl, A is a direct bond or $C_2$-$C_{10}$alkylene and n is an integer from 2 to 50.

These mixtures do not show any synergistic effect on polypropylene in fibre form.

In European Patent 290,388, the use of oxides and hydroxides of Al, Mg and Zn in a mixture with compounds containing groups of the formula (I) for the light stabilisation of polyethylene is claimed.

It has now been found, surprisingly, that mixtures analogous to those above are highly effective also in the light stabilisation of polypropylene, particularly in fibre form.

The compounds containing groups of the formula (I), which can be used according to the present invention, are:

a) compounds of the general formula (II)

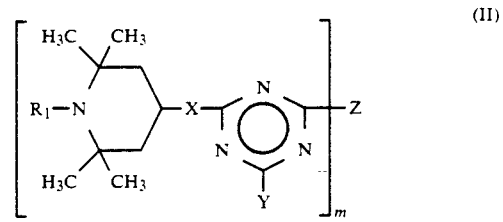

(II)

in which $R_1$ is as defined above for R, X is —O— or >N—$R_2$ where $R_2$ is hydrogen, $C_1$-$C_{18}$alkyl, $C_2$-$C_4$alkyl substituted in the 2-, 3- or 4-position by OH, by $C_1$-$C_8$alkoxy, by di-($C_1$-$C_4$alkyl)amino or by a 5- to 7-membered nitrogenous heterocyclic group with the free valency on the nitrogen atom, $C_5$-$C_{12}$cycloalkyl, $C_7$-$C_9$phenylalkyl, tetrahydrofurfuryl or a group of the formula (III)

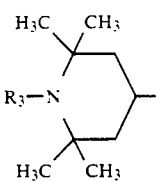 (III)

where R₃ is as defined for R, or X is 1,4-piperazinediyl or a group of the formula (IVa) or (IVb)

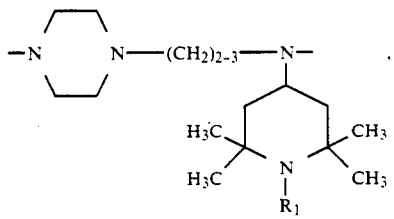 (IVa)

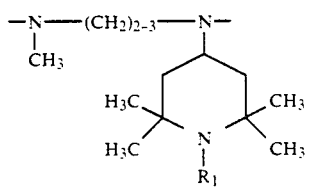 (IVb)

with $R_1$ being as defined above and with the nitrogen atom substituted by the piperidyl group being bound to the triazine ring, Y is one of the groups

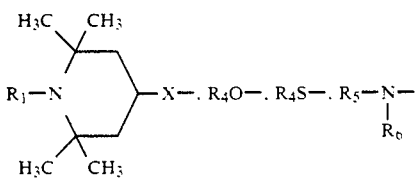

in which $R_1$ and X are as defined above and $R_4$, $R_5$ and $R_6$ which can be identical or different are as defined for $R_2$ with the exception of the definition as a group of the formula (III), or they are $C_3-C_{18}$alkenyl or phenyl which is unsubstituted or mono-, di- or tri-substituted by $C_1-C_4$alkyl or $C_1-C_4$alkoxy, or

is a 5- to 7-membered nitrogenous heterocyclic group, m is an integer from 1 to 6, and, if m is 1, Z is as defined for Y, and, if m is 2, Z is one of the groups of the formulae (Va)-(Vc)

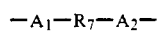 (Va)

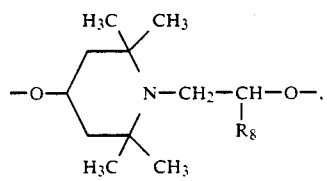 (Vb)

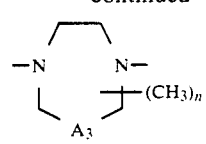 (Vc)

in which $A_1$ and $A_2$ which can be identical or different are —O— or >N—R₉ with R₉ being hydrogen, $C_1-C_{18}$alkyl, $C_5-C_{12}$cycloalkyl, $C_7-C_9$phenylalkyl or a group of the formula (III), $R_7$ is $C_2-C_{12}$alkylene, cyclohexylene, cyclohexylenedimethylene, methylenedicyclohexylene, isopropylidenedicyclohexylene, phenylene, isopropylidenediphenylene, xylylene or $C_4-C_{12}$alkylene interrupted by 1, 2 or 3 oxygen atoms or by 1 or 2 >N—R₁₀ groups where R₁₀ is $C_1-C_{18}$alkyl, $C_5-C_{12}$cycloalkyl, $C_7-C_9$phenylalkyl or a group of the formula (III) or, if $A_1$ and $A_2$ both are >N—R₉, R₁₀ can also be hydrogen, $C_1-C_8$acyl or ($C_1-C_8$alkoxy)-carbonyl, or $R_7$ or $A_1R_7$ respectively are a group

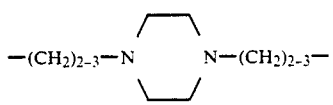

or a group

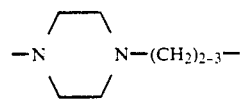

$R_8$ is $C_1-C_8$alkyl, $A_3$ is a direct bond or —CH₂— and n is zero, 1, 2 or 3, and, if m is 3, Z is one of the groups of the formulae (VIa)-(VIe)

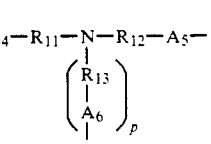 (VIa)

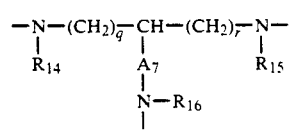 (VIb)

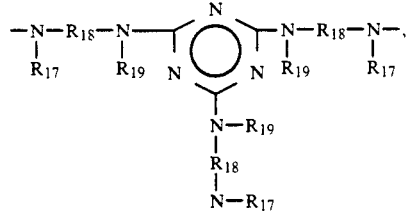 (VIc)

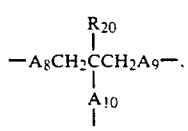 (VId)

-continued $$-O(CH_2)_5CHCH_2O- \quad (VIe)$$
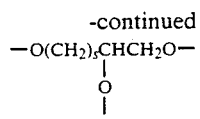

in which $A_4$, $A_5$, $A_6$, $A_8$, $A_9$ and $A_{10}$ which can be identical or different are as defined above for $A_1$ and $A_2$, and, if $A_8$ and $A_9$ both are —O—, $A_{10}$ can also be a —CH$_2$O— group, $R_{11}$, $R_{12}$, $R_{13}$ and $R_{18}$ which can be identical or different are $C_2$-$C_6$alkylene, p is zero or 1, $R_{14}$, $R_{15}$, $R_{16}$, $R_{17}$ and $R_{19}$ which can be identical or different are as defined above for $R_9$, $A_7$ is a direct bond or —CH$_2$—, q, r and s which can be identical or different are integers from 2 to 6 and $R_{20}$ is hydrogen or $C_1$-$C_8$alkyl, and, if m is 4, Z is one of the groups of the formulae (VIIa)-(VIId)

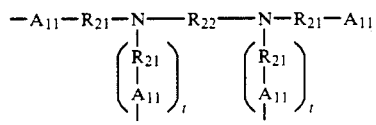
(VIIa)

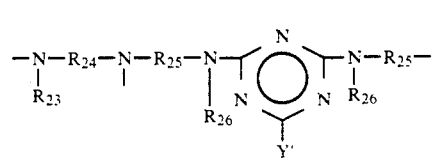
(VIIb)

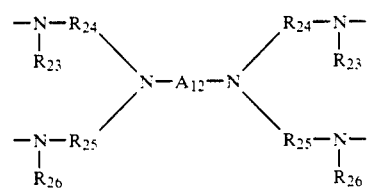
(VIIc)

$$R_{27} \diagup O \diagdown_4 \quad (VIId)$$

in which $A_{11}$ is as defined above for $A_1$ and $A_2$, $R_{21}$, $R_{22}$, $R_{24}$ and $R_{25}$ which can be identical or different are $C_2$-$C_6$alkylene, t is zero or 1, $R_{23}$ and $R_{26}$ which can be identical or different are as defined above for $R_9$, Y' is as defined for Y, $A_{12}$ is 2-hydroxytrimethylene, —CH$_2$CO—, xylylene, aliphatic or aromatic diacyl having not more than 12 carbon atoms, a group —COO(CH$_2$)$_{4-6}$OOC— or a group of the formula (VIII)

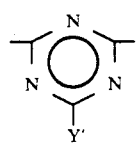
(VIII)

where Y' is as defined above, and $R_{27}$ is $C_4$-$C_{12}$alkanetetrayl, and, if m is 5 or 6, Z is a group of the formula (IX)

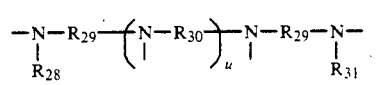
(IX)

in which $R_{28}$ and $R_{31}$ which can be identical or different are as defined above for $R_9$, $R_{29}$ and $R_{30}$ which can be identical or different are $C_2$-$C_6$alkylene and u is 2 or 3, and, if m is 6, Z is also a group of the formulae (Xa)-(Xc)

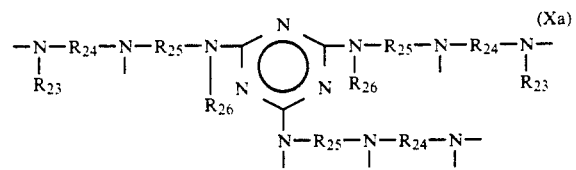
(Xa)

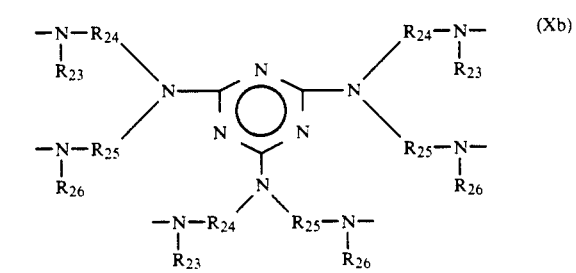
(Xb)

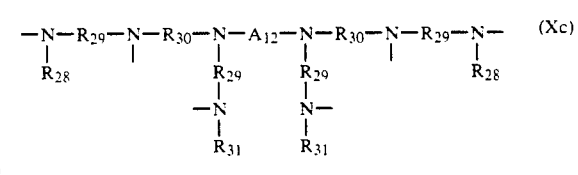
(Xc)

with $R_{23}$, $R_{24}$, $R_{25}$, $R_{26}$, $R_{28}$, $R_{29}$, $R_{30}$, $R_{31}$ and $A_{12}$ being as defined above;

b) oligomers having a molecular weight between 1,000 and 10,000 and containing recurring units of the formula (XI)

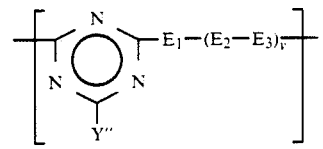
(XI)

in which Y" is as defined above for Y, $E_1$ and $E_3$ which can be identical or different are groups of the formulae (Va)-(Vc), $E_2$ is as defined above for $A_{12}$ and v is zero, 1, 2, 3 or 4, with the proviso that at least one group of the formula (III) must be present in each recurring unit of the formula (XI);

c) oligomers of the formula (XII)

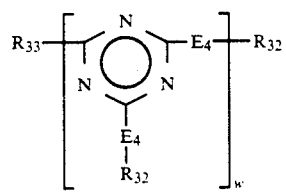
(XII)

in which $R_{32}$ is hydrogen, $C_1$-$C_8$alkyl, $C_3$-$C_6$alkenyl, $C_7$-$C_9$phenylalkyl, $C_1$-$C_8$acyl or ($C_1$-$C_8$alkoxy)-carbonyl, $E_4$ is a group of the formula (XIIIa) or (XIIIb)

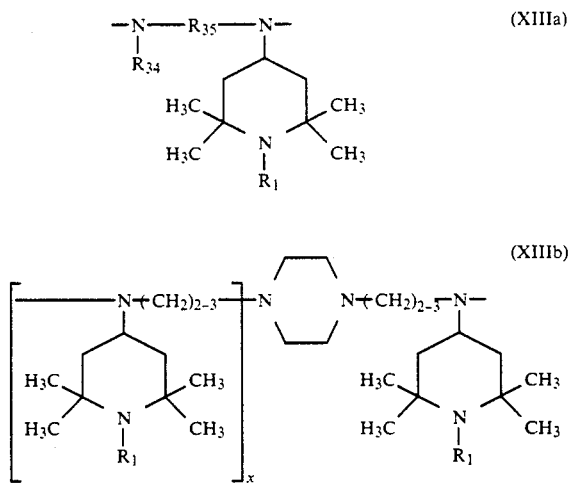

(XIIIa)

(XIIIb)

in which $R_{34}$ is as defined above for $R_9$, $R_{35}$ is $C_2$-$C_{12}$alkylene, cyclohexylene, cyclohexylenedimethylene, methylenedicyclohexylene, xylylene or $C_4$-$C_{12}$alkylene interrupted by 1, 2 or 3 oxygen atoms or by a group >N—$CH_3$, $R_1$ is as defined above and x is zero or 1, $R_{33}$ is OH, ONa, OK, $C_1$-$C_8$alkoxy, $C_3$-$C_6$alkenyloxy, $C_7$-$C_9$phenylalkoxy, $C_1$-$C_8$acyloxy, a group $R_{32}$-$E_4$- or a group of the formula (XIV)

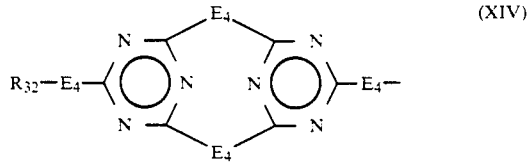

(XIV)

and w is a number from 1 to 20;

d) oligomers having a molecular weight between 1,000 and 10,000 and containing recurring units of the formula (XV)

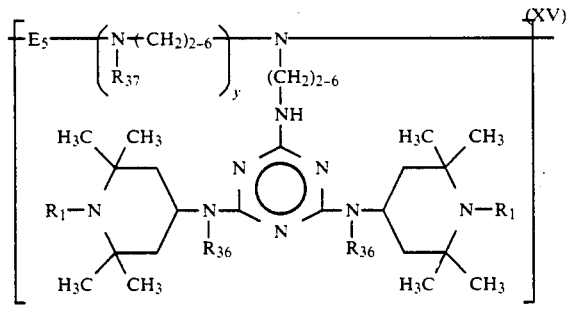

(XV)

in which $R_1$ is as defined above, $R_{36}$ is as defined above for $R_2$, $R_{37}$ is hydrogen, $C_1$-$C_{18}$alkyl, a group of the formula (III) or a group of the formula (XVI)

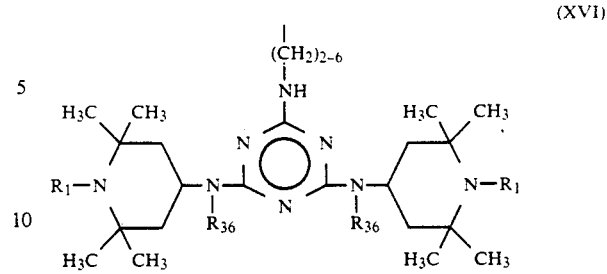

(XVI)

y is zero or 1 and $E_5$ is as defined above for $E_2$ or $C_2$-$C_6$alkylene.

Examples of alkyl having not more than 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkyl having not more than 12 carbon atoms is preferred.

Examples of $C_2$-$C_4$alkyl substituted by OH in the 2-, 3- or 4-position are 2-hydroxyethyl, 2-hydroxypropyl, 3-hydroxypropyl, 2-hydroxybutyl and 4-hydroxybutyl.

Examples of $C_2$-$C_4$alkyl substituted by $C_1$-$C_8$alkoxy in the 2-, 3- or 4-position are 2-methoxyethyl, 2-ethoxyethyl, 3-methoxypropyl, 3-ethoxypropyl, 3-butoxypropyl, 3-octoxypropyl and 4-methoxybutyl.

3-Methoxypropyl and 3-ethoxypropyl are preferred.

Examples of $C_2$-$C_4$alkyl substituted by di($C_1$-$C_4$alkyl)amino in the 2-, 3- or 4-position are 2-dimethylaminoethyl, 2-diethylaminoethyl, 3-dimethylaminopropyl, 3-diethylaminopropyl, 3-dibutylaminopropyl and 4-diethylaminobutyl.

3-Dimethylaminopropyl and 3-diethylaminopropyl are preferred.

Representative examples of $C_2$-$C_4$alkyl $R_2$ substituted in the 2-,3- or 4-position by a 5- to 7-membered nitrogenous heterocyclic group are groups of the formula

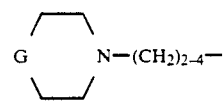

in which G is a direct bond, —O—, —$CH_2$— or —$CH_2$—$CH_2$—.

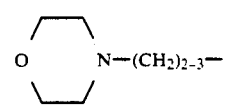

is preferred.

Examples of alkoxy having not more than 8 carbon atoms are methoxy, ethoxy, propoxy, isopropoxy, butoxy, isobutoxy, t-butoxy, pentoxy, isopentoxy, hexoxy, heptoxy and octoxy.

$C_6$-$C_8$alkoxy and in particular heptoxy and octoxy are preferred for $R_1$ and $R_3$.

Representative examples of $C_5$-$C_8$cycloalkoxy $R_1$ and $R_3$ are cyclopentoxy, cyclohexoxy, cycloheptoxy and cyclooctoxy.

Cyclopentoxy and cyclohexoxy are preferred.

The various $C_5$-$C_{12}$cycloalkyl substituents are unsubstituted or mono-, di- or tri-substituted by $C_1$-$C_4$alkyl; representative examples are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Cyclohexyl is preferred.

Examples of alkenyl having not more than 18 carbon atoms are allyl, 2-methylallyl, butenyl, pentenyl, hexenyl, undecenyl and oleyl. Alkenyl groups in which the carbon atom in the 1-position is saturated are preferred; allyl is particularly preferred.

Examples of substituted phenyl are methylphenyl, dimethylphenyl, trimethylphenyl, t-butylphenyl, di-t-butylphenyl, methoxyphenyl and ethoxyphenyl.

The various $C_7$-$C_9$phenylalkyl substituents are unsubstituted or mono-, di- or tri-substituted on the phenyl by $C_1$-$C_4$alkyl; representative examples are benzyl, methylbenzyl, dimethylbenzyl, t-butylbenzyl and 2-phenylethyl. Benzyl is preferred. Acyl $R_1$, $R_3$ and $R_{10}$ having not more than 8 carbon atoms can be an aliphatic or aromatic group.

Representative examples are formyl, acetyl, propionyl, butyryl, pentanoyl, hexanoyl, heptanoyl, octanoyl, benzoyl, acryloyl or crotonyl. Acetyl is preferred.

A

group as a 5- to 7-membered heterocyclic group can contain a further hetero atom, for example nitrogen or oxygen; representative examples are 1-pyrrolidyl, 1-piperidyl, 4-morpholinyl, 4-methyl-1-piperazinyl and 1-hexahydroazepinyl. 4-Morpholinyl is preferred.

Examples of alkylene having not more than 12 carbon atoms are ethylene, propylene, trimethylene, tetramethylene, pentamethylene, 2,2-dimethyltrimethylene, hexamethylene, trimethylhexamethylene, octamethylene, decamethylene and dodecamethylene.

Examples of $C_4$-$C_{12}$alkylene interrupted by 1,2 or 3 oxygen atoms are 3-oxapentane-1,5-diyl, 4-oxaheptane-1,7-diyl, 3,6-dioxaoctane-1,8-diyl, 4,7-dioxadecane-1,10-diyl, 4,9-dioxadodecane-1,12-diyl and 3,6,9-trioxaundecane-1,11-diyl.

Representative examples of $C_4$-$C_{12}$alkylene $R_7$ interrupted by 1 or 2 >N—$R_{10}$ groups are the groups

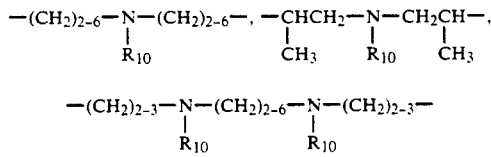

A representative example of $C_4$-$C_{12}$alkylene $R_{36}$ interrupted by an >N—$CH_3$ group is the group of the formula

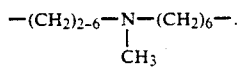

Examples of diacyl $A_{12}$ having not more than 12 carbon atoms are oxalyl, malonyl, succinyl, glutaryl, adipoyl, sebacoyl, isophthaloyl and terephthaloyl.

Preferred examples of $C_4$-$C_{12}$alkanetetrayl $R_{27}$ are 1,2,3,4-butanetetrayl and the group

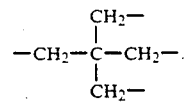

Preferred compounds containing groups of the formula (I), which can be used according to the present invention, are those of the formula (II) in which $R_1$ is hydrogen, methyl, allyl, benzyl or acetyl, X is —O— or >N—$R_2$, $R_2$ is hydrogen, $C_1$-$C_{12}$alkyl, $C_2$-$C_3$alkyl substituted in the 2- or 3-position by $C_1$-$C_4$alkoxy, by dimethylamino, by diethylamino or by 4-morpholinyl, cyclohexyl, benzyl, tetrahydrofurfuryl or a group of formula (III) with $R_3$ being as defined above for $R_1$, Y is a group

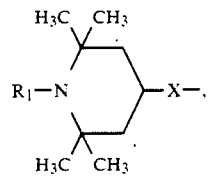

m is an integer from 2 to 6 and, if m is 2, Z is a group of the formula (Va) in which $A_1$ and $A_2$ are >N—$R_9$ with $R_9$ being hydrogen, $C_1$-$C_{12}$alkyl, cyclohexyl, benzyl or a group of the formula (III), $R_7$ is $C_2$-$C_6$alkylene, cyclohexylenedimethylene, methylenedicyclohexylene, xylylene or $C_4$-$C_{10}$alkylene interrupted by 1 or 2 oxygen atoms or by 1 or 2>N—$R_{10}$ groups where $R_{10}$ is hydrogen, $C_1$-$C_{12}$alkyl, cyclohexyl, benzyl, a group of the formula (III), $C_1$-$C_4$acyl or ($C_1$-$C_4$alkoxy)-carbonyl, or Z is a group

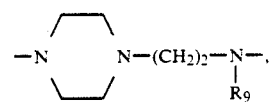

and, if m is 3, Z is a group of the formula (VIa) in which $A_4$ and $A_5$ are as defined above for $A_1$ and $A_2$, $R_{11}$ and $R_{12}$ which can be identical or different are $C_2$-$C_6$alkylene and p is zero, and, if m is 4, Z is a group of the formula (VIIa) or (VIIc) in which $A_{11}$ is as defined above for $A_1$ and $A_2$, $R_{21}$, $R_{22}$, $R_{24}$ and $R_{25}$ which can be identical or different are $C_2$-$C_6$alkylene, t is zero, $R_{23}$ and $R_{26}$ are as defined above for $R_9$ and $A_{12}$ is aliphatic or aromatic diacyl having not more than 10 carbon atoms or a group —COO($CH_2$)$_{4-6}$OOC—, and, if m is 5 or 6, Z is a group of the formula (IX) in which $R_{28}$ and $R_{31}$ are as defined above for $R_9$, $R_{29}$ and $R_{30}$ which can be identical or different are $C_2$-$C_6$alkylene and u is 2 or 3, and, if m is 6, Z is also a group of the formula (Xc) with $R_{28}$, $R_{29}$, $R_{30}$, $R_{31}$ and $A_{12}$ being as defined above; oligomers having a molecular weight between 1,000 and 5,000 and containing recurring units of the formula (XI) in which Y″ is one of the groups

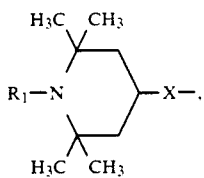

$R_4O$— and

where $R_1$ and X are as defined above, and $R_4$, $R_5$ and $R_6$ which can be identical or different are as defined above for $R_2$, or

is 4-morpholinyl, $E_1$ and $E_3$ which can be identical or different are groups of the formulae (Va)-(Vc) where $A_1$, $A_2$ and $R_7$ are as defined above, $R_8$ is hydrogen or methyl, $A_3$ is a direct bond and n is zero, $E_2$ is 2-hydroxytrimethylene, aliphatic or aromatic diacyl having not more than 10 carbon atoms, a group —COO($CH_2$)$_{4-6}$OOC— or a group of the formula (VIII) where Y' is as defined for Y" and v is zero, 1 or 2, with the proviso that at least one group of the formula (III) must be present in each recurring unit of the formula (XI); oligomers of the formula (XII) in which $R_{32}$ is hydrogen, $C_1$-$C_4$alkyl, $C_1$-$C_4$acyl or ($C_1$-$C_4$alkoxy)-carbonyl, $E_4$ is a group of the formula (XIIIa) or (XIIIb) in which $R_{34}$ is as defined above for $R_9$, $R_{35}$ is $C_2$-$C_6$alkylene, cyclohexylenedimethylene, methylenedicyclohexylene or $C_4$-$C_{10}$alkylene interrupted by 1 or 2 oxygen atoms or by an >N—$CH_3$ group, $R_1$ is as defined above and x is zero or 1, $R_{33}$ is OH, ONa, OK, $C_1$-$C_4$alkoxy, $C_1$-$C_4$acyloxy, a group $R_{32}$-$E_4$- or a group of the formula (XIV) and w is a number from 1 to 10; oligomers having a molecular weight between 1000 and 5000 and containing recurring units of the formula (XV) in which $R_1$ is as defined above, $R_{36}$ is as defined above for $R_2$, $R_{37}$ is hydrogen, $C_1$-$C_{12}$alkyl, a group of the formula (III) or a group of the formula (XVI), y is 1 and $E_5$ is as defined above for $E_2$ or $C_2$-$C_6$alkylene.

Particularly preferred compounds containing groups of the formula (I), which can be used according to the present invention are a) those of the formula (II) in which $R_1$ is hydrogen or methyl, X is >N—$R_2$, $R_2$ is $C_1$-$C_8$alkyl, 2,2,6,6-tetramethyl-4-piperidyl or 1,2,2,6,6-pentamethyl-4-piperidyl, Y is a group

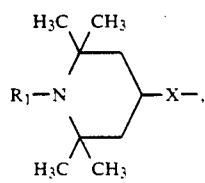

m is 2, 3 or 4 and, if m is 2, Z is a group of the formula (Va) in which $A_1$ and $A_2$ are >N—$R_9$ with $R_9$ being hydrogen, $C_1$-$C_4$alkyl, 2,2,6,6-tetramethyl-4-piperidyl, or 1,2,2,6,6-pentamethyl-4-piperidyl, $R_7$ is $C_2$-$C_6$alkylene, cyclohexylenedimethylene, methylenedicyclohexylene, xylylene or $C_4$-$C_{10}$alkylene interrupted by 1 or 2 oxygen atoms or by an >N—$R_{10}$ group where $R_{10}$ is hydrogen, methyl, cyclohexyl, benzyl, $C_1$-$C_4$acyl or ($C_1$-$C_4$alkoxy)-carbonyl, or Z is a group

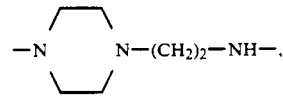

and, if m is 3, Z is a group of the formula (VIa) in which $A_4$ and $A_5$ are as defined above for $A_1$ and $A_2$, $R_{11}$ and $R_{12}$ which can be identical or different are $C_2$-$C_6$alkylene and p is zero, and, if m is 4, Z is a group of the formula (VIIa) or (VIIc) in which $A_{11}$ is as defined above for $A_1$ and $A_2$, $R_{21}$, $R_{22}$, $R_{24}$ and $R_{25}$ which can be identical or different, are $C_2$-$C_6$alkylene, t is zero, $R_{23}$ and $R_{26}$ are as defined above for $R_9$ and $A_{12}$ is aliphatic $C_2$-$C_{10}$diacyl or a group —COO($CH_2$)$_{4-6}$OOC—; b) oligomers having a molecular weight between 1,500 and 5,000 and containing recurring units of the formula (XI) in which Y" is one of the groups

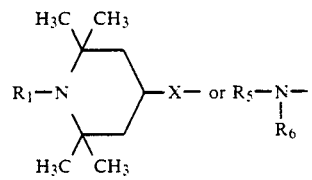

where $R_1$ and X are as defined above and $R_5$ and $R_6$ which can be identical or different are $C_1$-$C_8$alkyl, or $R_5$ can also be hydrogen, or

is 4-morpholinyl, $E_1$ is a group of the formula (Va) as defined above and v is zero, with the proviso that at least one group of the formula (III) must be present in each recurring unit of the formula (XI); c) oligomers of the formula (XII) in which $R_{32}$ is hydrogen, methyl, acetyl or ($C_1$-$C_2$alkoxy)-carbonyl, $E_4$ is a group of the formula (XIIIa) in which $R_{34}$ is 2,2,6,6-tetramethyl-4-piperidyl or 1,2,2,6,6-pentamethyl-4-piperidyl, $R_{35}$ is $C_2$-$C_6$alkylene or $C_8$-$C_{10}$alkylene interrupted by 2 oxygen atoms, $R_1$ is as defined above, $R_{33}$ is a group $R_{32}$-$E_4$- or a group of the formula (XIV) and w is a number from 1 to 5; oligomers having a molecular weight between 1,500 and 5,000 and containing recurring units of formula (XV) in which $R_1$ is as defined above, $R_{36}$ is as defined above for $R_2$, $R_{37}$ is hydrogen or a group of the formula (XVI), y is 1 and $E_5$ is $C_2$-$C_4$alkylene.

Compounds A) of particular interest, which can be used according to the present invention are:
A1)

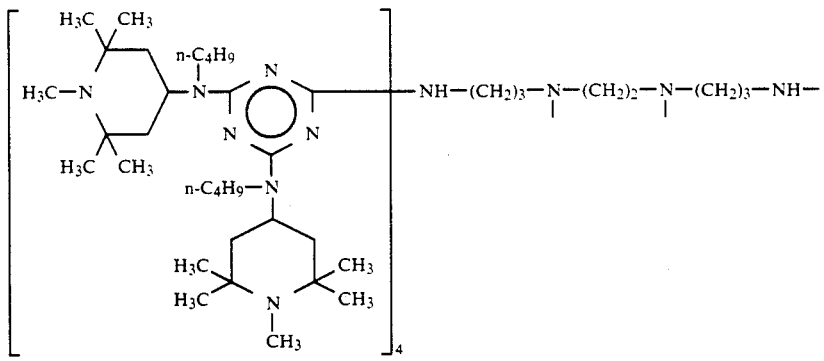
(A2)
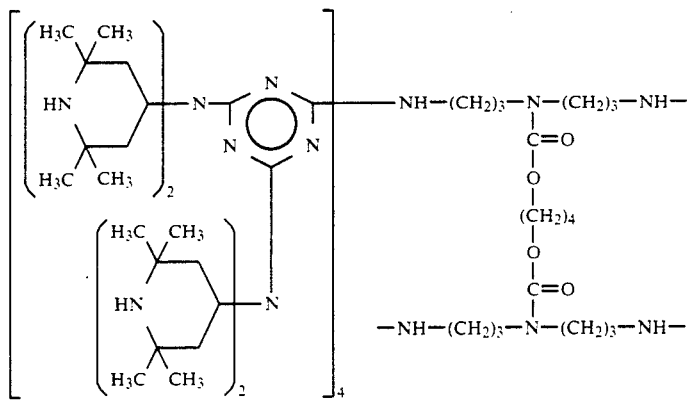
A3) oligomers having a molecular weight between 1,500 and 4,000 and containing recurring units of the formula
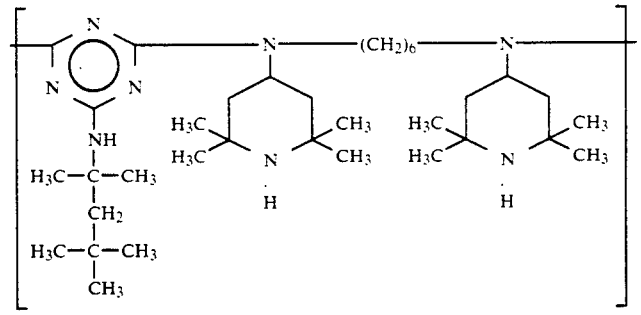
A4) oligomers having a molecular weight between 1,500 and 4,000 and containing recurring units of the formula
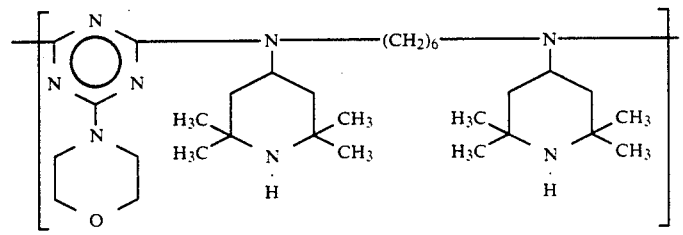
A5) oligomers having a molecular weight between 1,500 and 4,000 and containing recurring units of the formula

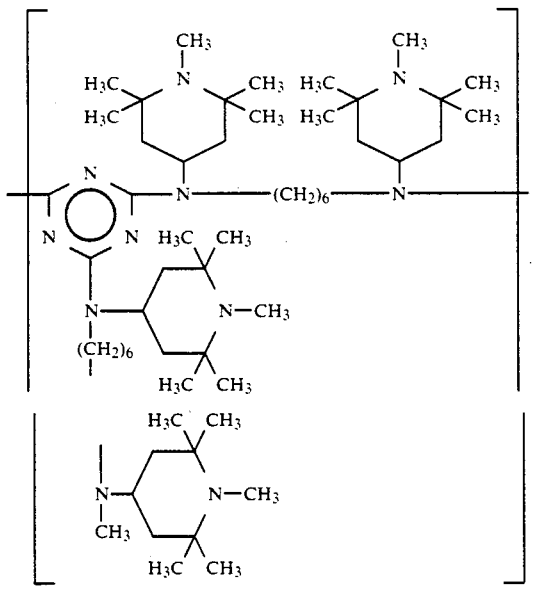

A6) oligomers having a molecular weight between 1,500 and 4,000 and containing recurring units of the formula

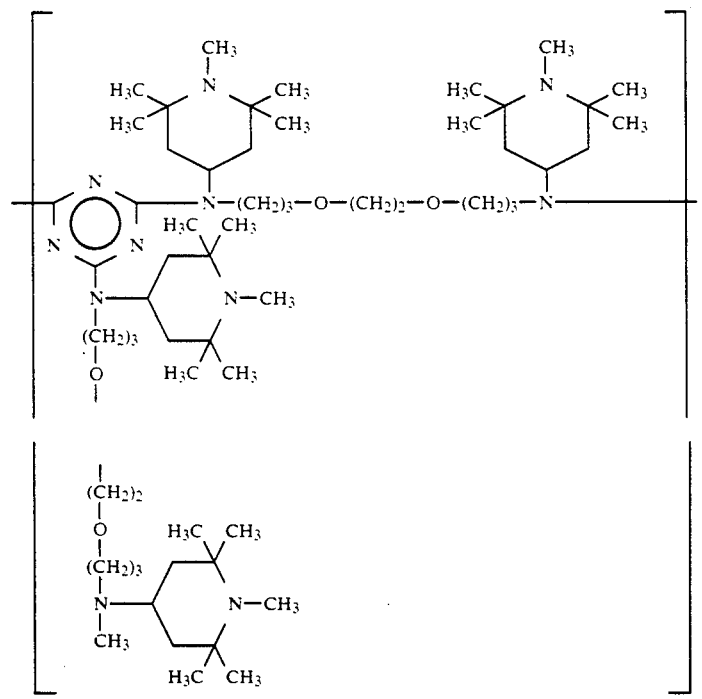

A7) oligomers having a molecular weight between 1,500 and 4,000 and containing recurring units of the formula

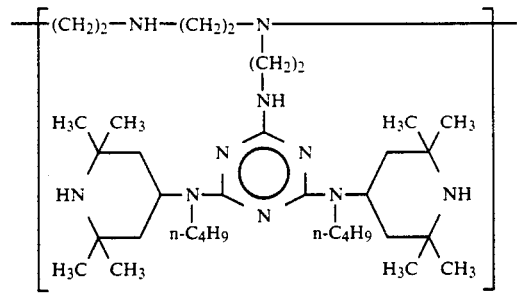

The said compounds can be used alone or as a mixture with one another.

The compounds (B) which can be used according to the present invention are preferably the oxides and hydroxides of Mg and Zn. The oxides of Mg and Zn are particularly preferred, and they can be used alone or as a mixture with one another. The weight ratio of A:B is preferably from 1:0.1 to 1:2.

The percentages by weight, relative to the weight of the polypropylene, of the compounds (A) and (B) which can be used according to the present invention are between 0.025 and 2%, preferably between 0.05 and 1%, for the compounds (A) and between 0.005 and 1%, preferably between 0.025 and 0.5%, for the compounds (B).

The compounds (A) and (B) can be mixed with one another before the addition to the polymer, or they can be added separately to the polymer, using any of the known procedures.

In addition to the compounds (A) and (B) of the present invention, other conventional additives for polypropylene, such as antioxidants, UV absorbers, nickel stabilisers, pigments, fillers, antistatic agents, flameproofing agents, lubricants, corrosion inhibitors and metal deactivators, can be added.

Particular examples of additives which can be used in admixture with the compounds (A) and (B) are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl) isocyanurate.

1.6. Acylaminophenols, for example lauric acid 4-hydroxyanilide, stearic acid 4-hydroxyanilide, 2,4-bis-(octylmercapto)-6-(3,5-di-tert-butyl-4-hydroxyanilino)-s-triazine, octyl N-(3,5-di-tert-butyl-4-hydroxyphenyl)-carbamate.

1.7. Esters of β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'bis(hydroxyethyl)oxamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)-trimethylenediamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of variously substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6. Oxalic acid diamides, for example, 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxamide, 2-ethoxy-5-tert-butyl-2'-ethyloxanilide and its mixtures with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3.5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

3. Metal deactivators, for example N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole,bis(benzylidene)oxalodihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite, tetrakis(2,4-di-tert-butylphenyl)4,4'-biphenylenediphosphonite, 3,9-bis(2,4-di-tert-butylphenoxy)-2,4,8,10-tetraoxa-3,9-diphosphaspiro[5.5]undecane.

4a. Hydroxylamines, for example dibenzylhydroxylamine, dioctylhydroxylamine, didodecylhydroxylamine, ditetradecylhydroxylamine, dihexadecylhydroxylamine, dioctadecylhydroxylamine, 1-hydroxy-2,2,6,6-tetramethyl-4-piperidyl benzoate or bis-(1-hydroxy-2,2,6,6-tetramethyl-4-piperidyl) sebacate.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide. pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium stearate, sodium ricinoleate and potassium palmitate, antimony pyrocatecholate or zinc pyrocatecholate.

8. Nucleating agents, for example 4-tert-butyl-benzoic acid, adipic acid, diphenylacetic acid.

9. Fillers and reinforcing agents, for example calcium carbonate, silicates, glass fibres, asbestos, talc, kaolin, mica, barium sulfate, metal oxides and hydroxides, carbon black, graphite.

10. Other additives, for example plasticizers, lubricants, emulsifiers, pigments, optical brighteners, flameproofing agents, antistatic agents and blowing agents.

The use of the mixtures stabilised according to the present invention is illustrated by the examples which follow; these are given solely for illustrative purposes and do not imply any restriction.

EXAMPLES 1-7

2.5 g of each of the products indicated in Table 1, 1 g of tris-(2,4-di-t-butylphenyl) phosphite, 0.5 g of calcium monoethyl 3,5-di-t-butyl-4-hydroxybenzylphosphonate, 1 g of calcium stearate, 2.5 g of titanium dioxide and MgO or ZnO in the quantities indicated in the table are mixed in a slow mixer with 1000 g of polypropylene powder of melt index=12 g/10 minutes (measured at 230° C. and 2.16 kg).

The mixtures are extruded at 200°-230° C. to give polymer granules which are then converted into fibres, using a pilot-type apparatus (Leonard, Sumirago (VA), Italy) operating under the following conditions:

Extruder temperature: 200°-230° C.
Head temperature: 255°-260° C.
Stretch ratio: 1:3.5
Count: 11 dtex per filament The fibres thus prepared are exposed, mounted on a white card, in a model 65 WR Weather-O-Meter (ASTM G 26-77) with a black panel temperature of 63° C.

The residual tenacity is measured on samples taken after various times of exposure to light by means of a constant-speed tensometer, and the exposure time in hours (T50) needed to halve the initial tenacity is then calculated.

Fibres prepared under the same conditions as indicated above, but without addition of the compounds of the invention, are exposed for comparison.

The results obtained are shown in Table 1:

TABLE 1

| Example No. | Compound (A) | Compound (B) (g) | T50 (hours) |
|---|---|---|---|
| 1 | 1 | — | 1110 |
| 2 | 1 | MgO (1) | 1600 |
| 3 | 1 | MgO (2) | 1700 |
| 4 | 1 | ZnO (1) | 1480 |
| 5 | 3 | — | 1270 |
| 6 | 3 | MgO (2) | 1600 |
| 7 | 3 | ZnO (1) | 1790 |

What is claimed is:

1. A stabiliser composition for polypropylene comprising

A) between 0.025 and 2% by weight, relative to the weight of the polypropylene, of one or more triazine compounds containing piperidine groups of the formula (I)

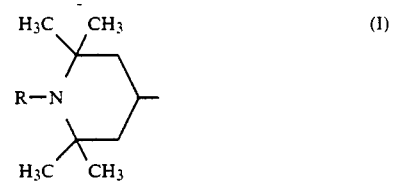

in which R is hydrogen, $C_1-C_4$alkyl, O•, OH, $C_1-C_8$alkoxy, $C_5-C_8$cycloalkoxy, $C_3-C_6$alkenyl, $C_7-C_9$phenylalkyl or $C_1-C_8$acyl, selected from the group consisting of a) compounds of the formula (II)

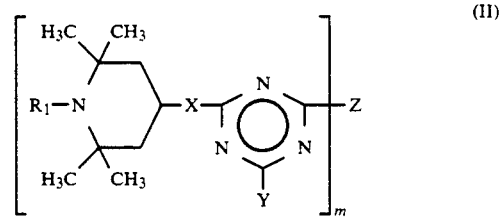

in which
$R_1$ is as defined above for R;
X is —O— or >N—$R_2$ where
$R_2$ is hydrogen, $C_1-C_{18}$alkyl, $C_2-C_4$alkyl substituted in the 2-, 3- or 4-position by OH, by $C_1-C_8$alkoxy, by di-($C_1-C_4$alkyl)amino or by a 5- to 7-membered nitrogenous heterocyclic group with the free valency on the nitrogen atom, $C_5-C_{12}$cycloalkyl, $C_7-C_9$-phenylalkyl, tetrahydrofurfuryl or a group of the formula (III)

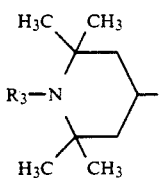 (III)

where R₃ is as defined for R;
or X is 1,4-piperazinediyl or a group of the formula (IVa) or (IVb)

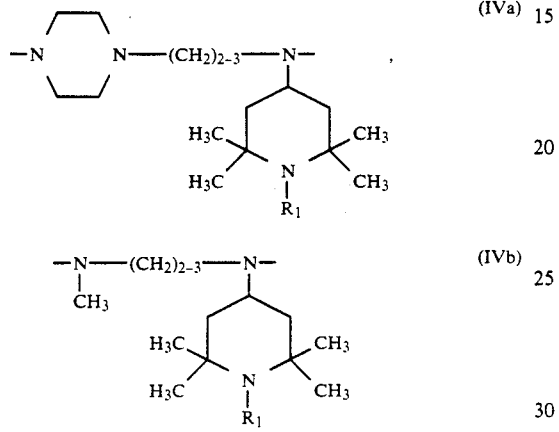

with $R_1$ being as defined above and with the nitrogen atom substituted by the piperidyl group being bound to the triazine ring;
Y is one of the groups

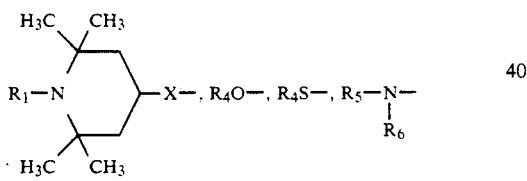

in which $R_1$ and X are as defined above and $R_4$, $R_5$ and $R_6$ which can be identical or different are as defined for $R_2$ with the exception of the definition as a group of the formula (III), or they are $C_3$-$C_{18}$alkenyl or phenyl which is unsubstituted or mono-, di- or tri-substituted by $C_1$-$C_4$alkyl or $C_1$-$C_4$alkoxy; or

is a 5- to 7-membered nitrogenous heterocyclic group;
m is an integer from 1 to 6;
and, if m is 1, Z is as defined for Y;
and, if m is 2, Z is one of the groups of the formulae (Va)–(Vc)

—$A_1$—$R_7$—$A_2$— (Va)

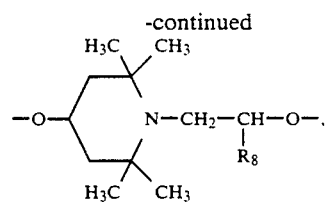

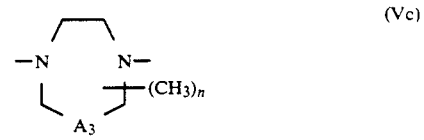

in which
$A_1$ and $A_2$ which can be identical or different are —O— or >N—$R_9$ with $R_9$ being hydrogen, $C_1$-$C_{18}$alkyl, $C_5$-$C_{12}$cycloalkyl, $C_7$-$C_9$phenylalkyl or a group of the formula (III);
$R_7$ is $C_2$-$C_{12}$alkylene, cyclohexylene, cyclohexylenedimethylene, methylenedicyclohexylene, isopropylidenedicyclohexylene, phenylene, isopropylidenediphenylene, xylylene or $C_4$-$C_{12}$alkylene interrupted by 1, 2 or 3 oxygen atoms or by 1 or 2 >N—$R_{10}$ groups
where $R_{10}$ is $C_1$-$C_{18}$alkyl, $C_5$-$C_{12}$cycloalkyl, $C_7$-$C_9$phenylalkyl or a group of the formula (III);
or, if $A_1$ and $A_2$ both are >N—$R_9$, $R_{10}$ can also be hydrogen, $C_1$-$C_8$acyl or ($C_1$-$C_8$alkoxy)-carbonyl;
or $R_7$ or $A_1R_7$ respectively are a group

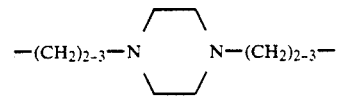

or a group

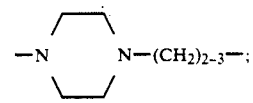

$R_8$ is $C_1$-$C_8$alkyl;
$A_3$ is a direct bond or $CH_2$
and n is zero, 1, 2 or 3;
and, if m is 3, Z is one of the groups of the formulae (VIa)–(VIe)

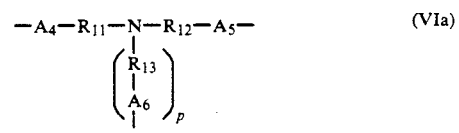

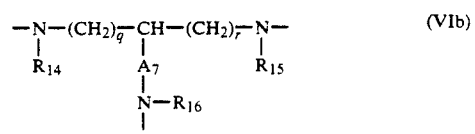

-continued

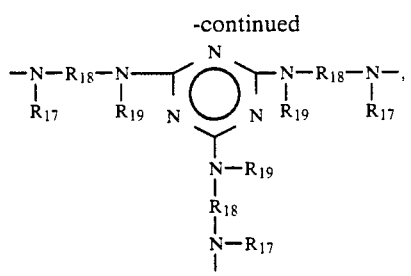 (VIc)

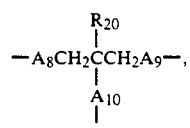 (VId)

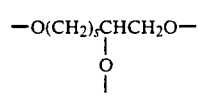 (VIe)

in which $A_4$, $A_5$, $A_6$, $A_8$, $A_9$ and $A_{10}$ which can be identical or different are as defined above for $A_1$ and $A_2$;

and, if $A_8$ and $A_9$ both are —O—, $A_{10}$ can also be a —CH$_2$O— group;

$R_{11}$, $R_{12}$, $R_{13}$ and $R_{18}$ which can be identical or different are $C_2$-$C_6$alkylene;

p is zero or 1;

$R_{14}$, $R_{15}$, $R_{16}$, $R_{17}$ and $R_{19}$ which can be identical or different are as defined above for $R_9$;

$A_7$ is a direct bond or —CH$_2$— q, r and s which can be identical or different are integers from 2 to 6 and $R_{20}$ is hydrogen or $C_1$-$C_8$alkyl;

and, if m is 4, Z is one of the groups of the formulae (VIIa)-(VIId)

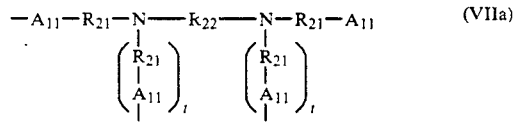 (VIIa)

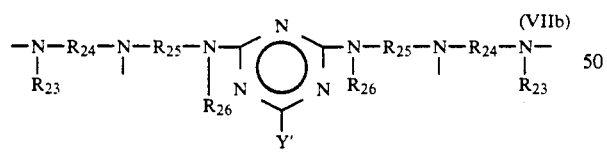 (VIIb)

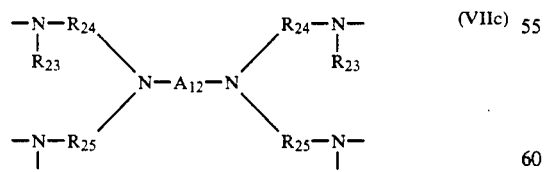 (VIIc)

$R_{27}$—(—O—)$_t$  (VIId)

in which $A_{11}$ is as defined above for $A_1$ and $A_2$;

$R_{21}$, $R_{22}$, $R_{24}$ and $R_{25}$ which can be identical or different are $C_2$-$C_6$alkylene;

t is zero or 1;

$R_{23}$ and $R_{26}$ which can be identical or different are as defined above for $R_9$;

Y' is as defined for Y;

$A_{12}$ is 2-hydroxytrimethylene, —CH$_2$CO—, xylylene, aliphatic or aromatic diacyl having not more than 12 carbon atoms, a group —COO(CH$_2$)$_{4-6}$OOC— or a group of the formula (VIII)

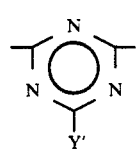 (VIII)

where Y' is as defined above;

and $R_{27}$ is $C_4$-$C_{12}$alkanetetrayl;

and, if m is 5 or 6, Z is a group of the formula (IX)

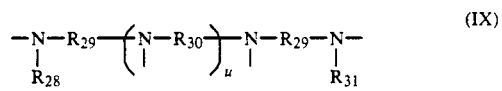 (IX)

in which $R_{28}$ and $R_{31}$ which can be identical or different are as defined above for $R_9$; $R_{29}$ and $R_{30}$ which can be identical or different are $C_2$-$C_6$alkylene and u is 2 or 3;

and, if m is 6, Z is also a group of the formulae (Xa)-(Xc)

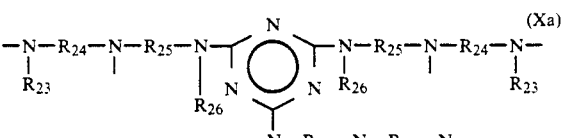 (Xa)

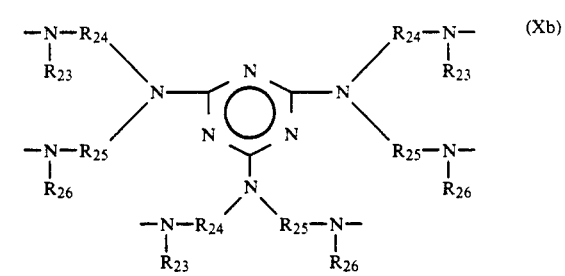 (Xb)

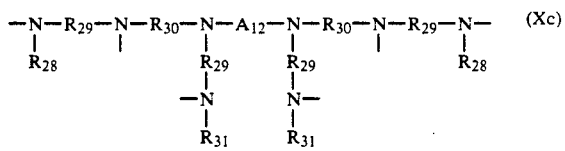 (Xc)

with $R_{23}$, $R_{24}$, $R_{25}$, $R_{26}$, $R_{28}$, $R_{29}$, $R_{30}$, $R_{31}$ and $A_{12}$ being as defined above;

b) oligomers having a molecular weight between 1,000 and 10,000 and containing recurring units of the formula (XI)

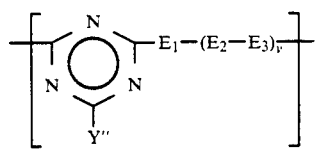 (XI)

in which
Y" is as defined above for Y;
E₁ and E₃ which can be identical or different are groups of the formulae (Va)-(Vc);
E₂ is as defined above for A₁₂
and v is zero, 1, 2, 3 or 4, with the proviso that at least one group of the formula (III) must be present in each recurring unit of the formula (XI);
c) oligomers of the formula (XII)

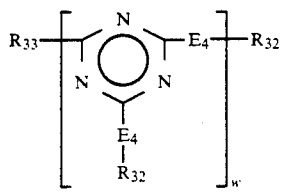 (XII)

in which
$R_{32}$ is hydrogen, $C_1$-$C_8$alkyl, $C_3$-$C_6$alkenyl, $C_7$-$C_9$phenylalkyl, $C_1$-$C_8$acyl or ($C_1$-$C_8$alkoxy)-carbonyl;
$E_4$ is a group of the formula (XIIIa) or (XIIIb)

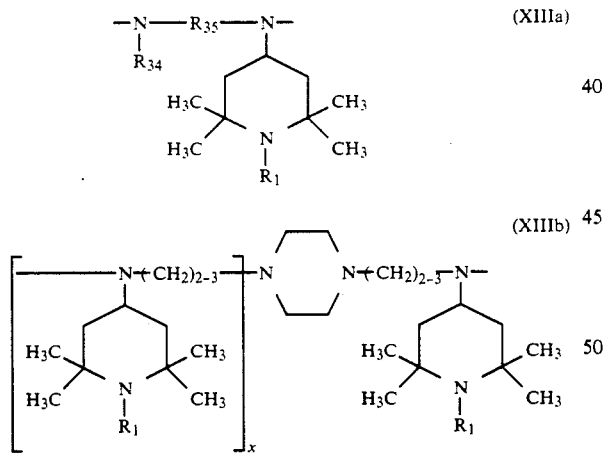

(XIIIa)

(XIIIb)

in which
$R_{34}$ is as defined above for $R_9$
$R_{35}$ is $C_2$-$C_{12}$alkylene, cyclohexylene, cyclohexylenedimethylene, methylenedicyclohexylene, xylylene or $C_4$-$C_{12}$alkylene interrupted by 1, 2 or 3 oxygen atoms or by a group >N—CH₃;
$R_1$ is as defined above and x is zero or 1;
$R_{33}$ is OH, ONa, OK, $C_1$-$C_8$alkoxy, $C_3$-$C_6$alkenyloxy, $C_7$-$C_9$phenylalkoxy, $C_1$-$C_8$acyloxy, a group $R_{32}$-$E_4$- or a group of the formula (XIV)

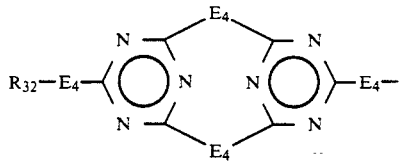 (XIV)

and w is a number from 1 to 20;
d) oligomers having a molecular weight between 1,000 and 10,000 and containing recurring units of the formula (XV)

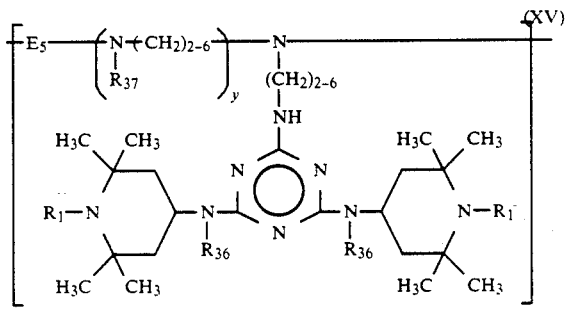 (XV)

in which
$R_1$ is as defined above;
$R_{36}$ is as defined above for $R_2$;
$R_{37}$ is hydrogen, $C_1$-$C_{18}$alkyl, a group of the formula (III) or a group of the formula (XVI)

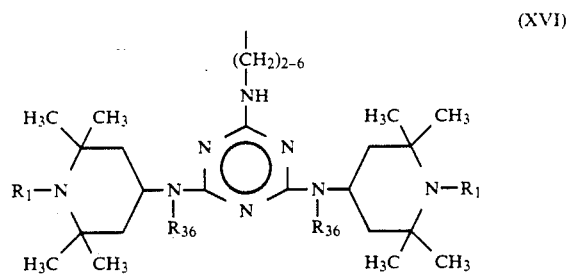 (XVI)

y is zero or 1
and $E_5$ is as defined above for $E_2$ or $C_2$-$C_6$alkylene, and
B) between 0.005 and 1% by weight, relative to the weight of the polypropylene, of one or more oxides and hydroxides of Mg, Ca, Ba, Zn, Al and Sn.

2. A stabiliser composition according to claim 1, wherein the compound (A) containing groups of the formula (I) is selected from the group comprising compounds of the formula (II) in which $R_1$ is hydrogen, methyl, allyl, benzyl or acetyl, X is —O— or >N—$R_2$, $R_2$ is hydrogen, $C_1$-$C_{12}$alkyl, $C_2$-$C_3$alkyl substituted in the 2- or 3-position by $C_1$-$C_4$alkoxy, by dimethylamino, by diethylamino or by 4-morpholinyl, cyclohexyl, benzyl, tetrahydrofurfuryl or a group of formula (III) with $R_3$ being as defined above for $R_1$, Y is a group

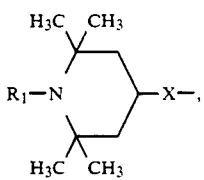

m is an integer from 2 to 6 and, if m is 2, Z is a group of the formula (Va) in which $A_1$ and $A_2$ are $>N-R_9$ with $R_9$ being hydrogen, $C_1-C_{12}$alkyl, cyclohexyl, benzyl or a group of the formula (III), $R_7$ is $C_2-C_6$alkylene, cyclohexylenedimethylene, methylenedicylohexylene, xylylene or $C_4-C_{10}$alkylene interrupted by 1 or 2 oxygen atoms or by 1 or 2 $>N-R_{10}$ groups where $R_{10}$ is hydrogen, $C_1-C_{12}$alkyl, cyclohexyl, benzyl, a group of the formula (III), $C_1-C_4$acyl or $(C_1-C_4$alkoxy$)$-carbonyl, or Z is a group

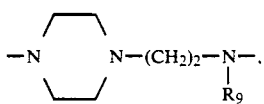

and, if m is 3, Z is a group of the formula (VIa) in which $A_4$ and $A_5$ are as defined above for $A_1$ and $A_2$, $R_{11}$ and $R_{12}$ which can be identical or different are $C_2-C_6$alkylene and p is zero, and, if m is 4, Z is a group of the formula (VIIa) or (VIIc) in which $A_{11}$ is as defined above for $A_1$ and $A_2$, $R_{21}$, $R_{22}$, $R_{24}$ and $R_{25}$ which can be identical or different are $C_2-C_6$alkylene, t is zero, $R_{23}$ and $R_{26}$ are as defined above for $R_9$ and $A_{12}$ is aliphatic or aromatic diacyl having not more than 10 carbon atoms or a group $-COO(CH_2)_{4-6}OOC-$, and, if m is 5 or 6, Z is a group of the formula (IX) in which $R_{28}$ and $R_{31}$ are as defined above for $R_9$, $R_{29}$ and $R_{30}$ which can be identical or different are $C_2-C_6$alkylene and u is 2 or 3, and, if m is 6, Z is also a group of the formula (Xc) with $R_{28}$, $R_{29}$, $R_{30}$, $R_{31}$ and $A_{12}$ being as defined above; oligomers having a molecular weight between 1,000 and 5,000 and containing recurring units of the formula (XI) in which Y" is one of the groups

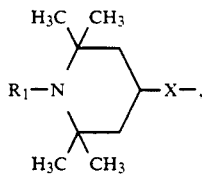

$R_4O-$ and

where $R_1$ and X are as defined above, and $R_4$, $R_5$ and $R_6$ which can be identical or different are as defined above for $R_2$, or

is 4-morpholinyl, $E_1$ and $E_3$ which can be identical or different are groups of the formulae (Va)-(Vc) where $A_1$, $A_2$ and $R_7$ are as defined above, $R_8$ is hydrogen or methyl, $A_3$ is a direct bond and n is zero, $E_2$ is 2-hydroxytrimethylene, aliphatic or aromatic diacyl having not more than 10 carbon atoms, a group $-COO(CH_2)_{4-6}OOC-$ or a group of the formula (VIII) where Y' is as defined for Y" and v is zero, 1 or 2, with the proviso that at least one group of the formula (III) must be present in each recurring unit of the formula (XI); oligomers of the formula (XII) in which $R_{32}$ is hydrogen, $C_1-C_4$alkyl, $C_1-C_4$acyl or $(C_1-C_4$alkoxy$)$-carbonyl, $E_4$ is a group of the formula (XIIIa) or (XIIIb) in which $R_{34}$ is as defined above for $R_9$, $R_{35}$ is $C_2-C_6$alkylene, cyclohexylenedimethylene, methylenedicyclohexylene or $C_4-C_{10}$alkylene interrupted by 1 or 2 oxygen atoms or by an $>N-CH_3$ group, $R_1$ is as defined above and x is zero or 1, $R_{33}$ is OH, ONa, OK, $C_1-C_4$alkoxy, $C_1-C_4$acyloxy, a group $R_{32}-E_4-$ or a group of the formula (XIV) and w is a number from 1 to 10; oligomers having a molecular weight between 1000 and 5000 and containing recurring units of the formula (XV) in which $R_1$ is as defined above, $R_{36}$ is as defined above for $R_2$, $R_{37}$ is hydrogen, $C_1-C_{12}$alkyl, a group of the formula (III) or a group of the formula (XVI), y is 1 and $E_5$ is as defined above for $E_2$ or $C_2-C_6$alkylene.

3. A stabiliser composition according to claim 1, wherein the compound (A) containing groups of the formula (I) is selected from a) the group comprising the compounds of the formula (II) in which $R_1$ is hydrogen or methyl, X is $>N-R_2$, $R_2$ is $C_1-C_8$alkyl, 2,2,6,6-tetramethyl-4-piperidyl or 1,2,2,6,6-pentamethyl-4-piperidyl, Y is a group

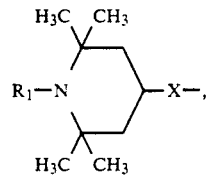

m is 2, 3 or 4 and, if m is 2, Z is a group of the formula (Va) in which $A_1$ and $A_2$ are $>N-R_9$ with $R_9$ being hydrogen, $C_1-C_4$alkyl, 2,2,6,6-tetramethyl-4-piperidyl, or 1,2,2,6,6-pentamethyl-4-piperidyl, $R_7$ is $C_2-C_6$alkylene, cyclohexylenedimethylene, methylenedicyclohexylene, xylylene or $C_4-C_{10}$alkylene interrupted by 1 or 2 oxygen atoms or by an $>N-R_{10}$ group where $R_{10}$ is hydrogen, methyl, cyclohexyl, benzyl, $C_1-C_4$acyl or $(C_1-C_4$alkoxy$)$-carbonyl, or Z is a group

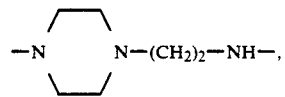

and, if m is 3, Z is a group of the formula (VIa) in which $A_4$ and $A_5$ are as defined above for $A_1$ and $A_2$, $R_{11}$ and $R_{12}$ which can be identical or different are $C_2-C_6$alkylene and p is zero, and, if m is 4, Z is a group of the formula (VIIa) or (VIIc) in which $A_{11}$ is as defined above for $A_1$ and $A_2$, $R_{21}$, $R_{22}$, $R_{24}$ and $R_{25}$ which can be identical or different are $C_2-C_6$alkylene, t is zero, $R_{23}$ and $R_{26}$ are as defined above for $R_9$ and $A_{12}$ is aliphatic $C_2-C_{10}$diacyl or a group $-COO(CH_2)_{4-6}OOC$; b) oligomers having a molecular weight between 1,500 and 5,000 and containing recurring units of the formula (XI) in which Y" is one of the groups

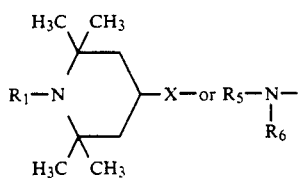

where $R_1$ and X are as defined above and $R_5$ and $R_6$ which can be identical or different are $C_1$-$C_8$alkyl, or $R_5$ can also be hydrogen, or

the formula (XII) in which $R_{32}$ is hydrogen, methyl, acetyl or ($C_1$-$C_2$alkoxy)-carbonyl, $E_4$ is a group of the formula (XIIIa) in which $R_{34}$ is 2,2,6,6-tetramethyl-4-piperidyl or 1,2,2,6,6-pentamethyl-4-piperidyl, $R_{35}$ is $C_2$-$C_6$alkylene or $C_8$-$C_{10}$alkylene interrupted by 2 oxygen atoms, $R_1$ is as defined above, $R_{33}$ is a group $R_{32}$-$E_4$- or a group of the formula (XIV) and w is a number from 1 to 5; c) oligomers having a molecular weight between 1,500 and 5,000 and containing recurring units of formula (XV) in which $R_1$ is as defined above, $R_{36}$ is as defined above for $R_2$, $R_{37}$ is hydrogen or a group of the formula (XVI), y is 1 and $E_5$ is $C_2$-$C_4$alkylene.

4. A stabiliser composition according to claim 1, wherein the compound (A) is that of the formula

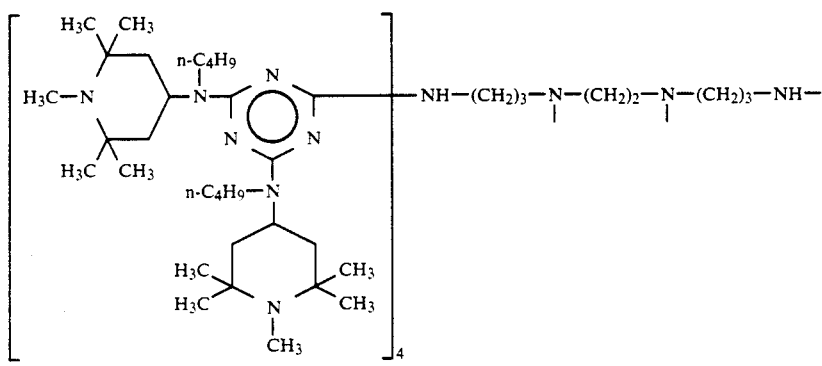

5. A stabiliser composition according to claim 1, wherein the compound (A) is that of the formula

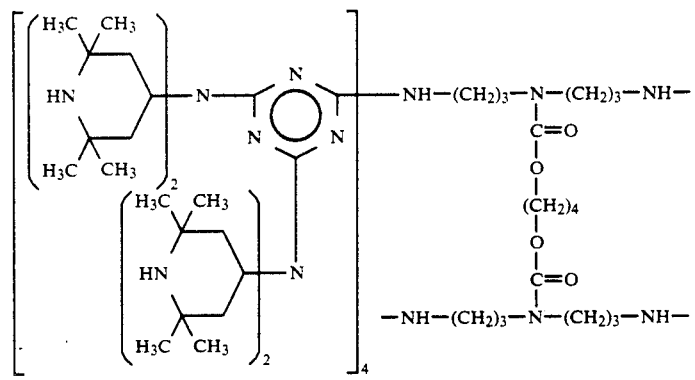

is 4-morpholinyl, $E_1$ is a group of the formula (Va) as defined above and v is zero, with the proviso that at least one group of the formula (III) must be present in each recurring unit of the formula (XI); oligomers of 6. A stabiliser composition according to claim 1, wherein the compound (A) is an oligomer having a molecular weight of 1500 to 4000 containing recurring units of the formula

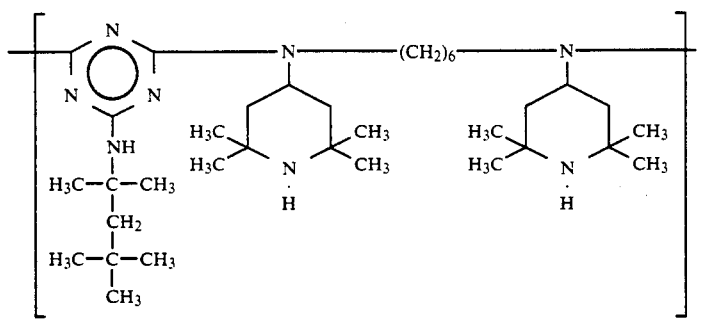

7. A stabiliser composition according to claim 1, wherein the compound (A) is an oligomer having a molecular weight of 1500 to 4000 containing recurring units of the formula

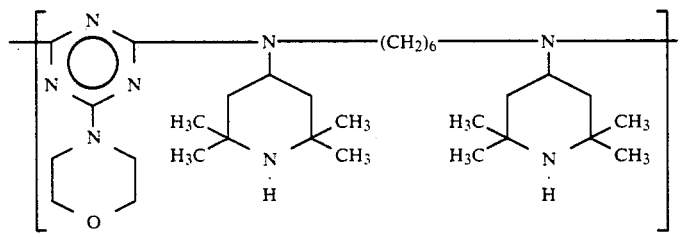

8. A stabiliser composition according to claim 1, wherein the compound (A) is an oligomer having a molecular weight of 1500 to 4000 containing recurring units of the formula

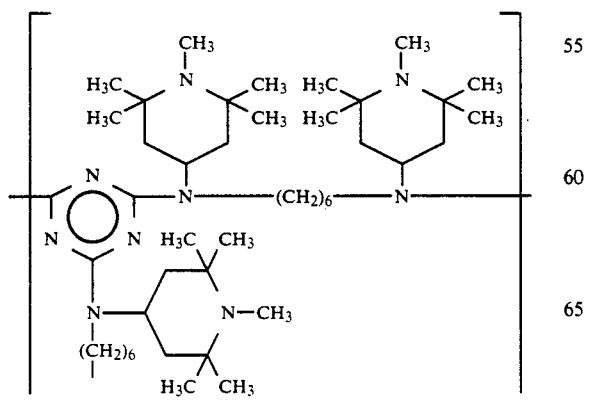

-continued

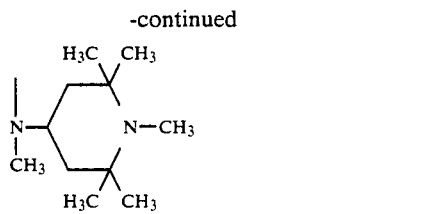

9. A stabiliser composition according to claim 1, wherein the compound (A) is an oligomer having a molecular weight of 1500 to 4000 containing recurring units of the formula

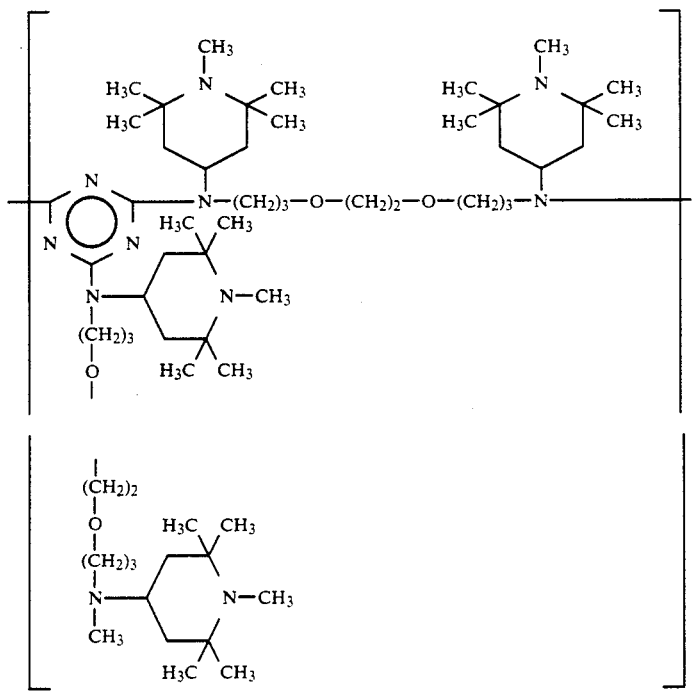
10. A stabiliser composition according to claim 1 wherein the compound B is magnesium oxide or zinc oxide.
11. A stabiliser composition according to claim 1 wherein the weight ratio of A:B is from 1:0.1 to 1:2.
* * * * *